US008898316B2

(12) United States Patent
Facemire et al.

(10) Patent No.: US 8,898,316 B2
(45) Date of Patent: Nov. 25, 2014

(54) ENHANCED ONLINE COLLABORATION SYSTEM FOR VIEWERS OF VIDEO PRESENTATIONS

(75) Inventors: Michael Dennis Facemire, Pittsboro, NC (US); Gerald Laverte Mitchell, Jr., Raleigh, NC (US); Michael C. Wanderski, Durham, NC (US); Gabriel Aaron Cohen, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 1296 days.

(21) Appl. No.: 11/755,590

(22) Filed: May 30, 2007

(65) Prior Publication Data

US 2008/0301232 A1 Dec. 4, 2008

(51) Int. Cl.
| | | |
|---|---|---|
| G06F 3/00 | (2006.01) | |
| G06F 15/16 | (2006.01) | |
| H04N 7/173 | (2011.01) | |
| H04N 9/80 | (2006.01) | |
| H04N 7/15 | (2006.01) | |
| H04L 12/18 | (2006.01) | |
| H04N 21/25 | (2011.01) | |
| H04N 21/442 | (2011.01) | |
| H04N 21/431 | (2011.01) | |
| H04N 21/4788 | (2011.01) | |

(52) U.S. Cl.
CPC .............. *H04N 7/15* (2013.01); *H04L 12/1818* (2013.01); *H04N 21/252* (2013.01); *H04N 21/44213* (2013.01); *H04N 21/4312* (2013.01); H04N 21/4788 (2013.01); *H04N 7/155* (2013.01)
USPC ........... 709/228; 386/241; 709/227; 709/229; 715/720; 715/733; 725/40; 725/102

(58) Field of Classification Search
CPC ....... H04N 7/15; H04N 7/155; H04N 21/252; H04N 21/4788; H04N 21/44213; H04N 21/4312; H04N 12/1818
USPC ........... 709/227, 228, 229; 386/241; 715/720, 715/733; 725/40, 102
See application file for complete search history.

(56) References Cited

U.S. PATENT DOCUMENTS

| | | | | |
|---|---|---|---|---|
| 5,694,163 | A | * | 12/1997 | Harrison ..................... 725/110 |
| 5,774,666 | A | * | 6/1998 | Portuesi ...................... 725/110 |
| 5,828,839 | A | * | 10/1998 | Moncreiff .................... 709/204 |
| 6,061,716 | A | * | 5/2000 | Moncreiff .................... 709/204 |
| 6,076,100 | A | * | 6/2000 | Cottrille et al. .............. 709/203 |
| 6,081,830 | A | * | 6/2000 | Schindler .................... 709/204 |
| 6,411,988 | B1 | * | 6/2002 | Tafoya et al. ................ 709/204 |
| 6,425,012 | B1 | * | 7/2002 | Trovato et al. ............... 709/227 |
| 6,697,824 | B1 | * | 2/2004 | Bowman-Amuah ......... 709/229 |
| 6,973,665 | B2 | * | 12/2005 | Dudkiewicz et al. .......... 725/46 |
| 7,036,083 | B1 | * | 4/2006 | Zenith ......................... 715/758 |

(Continued)

Primary Examiner — Daniel C Murray
(74) Attorney, Agent, or Firm — Convergent Law Group LLP

(57) ABSTRACT

An enhanced collaboration system makes it possible for viewers of post-original video presentations to collaborate online with others who are viewing the same video presentation at the same time. A collaborate room controller establishes and maintains sets of online collaboration sessions for the post-original video presentation with each collaboration session being associated with a particular time slot in the presentation. Typically, a viewer is assigned to a collaboration session that is associated with the user's current view point; i.e., the presentation time slot the user is currently viewing. A graphical user interface conveys information about existing collaboration sessions to the user to assist the user in selecting an appropriate collaboration session.

11 Claims, 8 Drawing Sheets

(56) References Cited

U.S. PATENT DOCUMENTS

| | | | |
|---|---|---|---|
| 7,089,278 B1* | 8/2006 | Churchill et al. | 709/203 |
| 7,124,164 B1 | 10/2006 | Chemtob | |
| 7,143,428 B1* | 11/2006 | Bruck et al. | 725/37 |
| 7,231,131 B2* | 6/2007 | Ostrover | 386/241 |
| 7,290,698 B2* | 11/2007 | Poslinski et al. | 235/375 |
| 7,305,436 B2* | 12/2007 | Willis | 709/204 |
| 7,441,199 B2* | 10/2008 | Zenith | 715/758 |
| 7,478,334 B2* | 1/2009 | Chen et al. | 715/759 |
| 7,600,189 B2* | 10/2009 | Fujisawa | 715/765 |
| 7,624,416 B1* | 11/2009 | Vandermolen et al. | 725/109 |
| 7,669,213 B1* | 2/2010 | Wick et al. | 725/37 |
| 7,739,584 B2* | 6/2010 | Vella et al. | 715/203 |
| 7,917,583 B2* | 3/2011 | Angiolillo et al. | 709/204 |
| 7,945,622 B1* | 5/2011 | Pegg | 709/204 |
| 8,122,474 B2* | 2/2012 | Tecot et al. | 725/80 |
| 8,255,950 B1* | 8/2012 | Wick et al. | 725/37 |
| 8,430,299 B2* | 4/2013 | Poslinski et al. | 235/375 |
| 8,614,718 B2* | 12/2013 | Rapo et al. | 345/581 |
| 8,762,844 B2* | 6/2014 | Kim et al. | 715/716 |
| 2002/0059584 A1* | 5/2002 | Ferman et al. | 725/34 |
| 2002/0198973 A1* | 12/2002 | Besaw | 709/223 |
| 2003/0026593 A1* | 2/2003 | Ostrover | 386/54 |
| 2003/0101450 A1* | 5/2003 | Davidsson et al. | 725/32 |
| 2003/0122922 A1* | 7/2003 | Saffer et al. | 348/14.01 |
| 2003/0208545 A1* | 11/2003 | Eaton et al. | 709/206 |
| 2004/0098754 A1* | 5/2004 | Vella et al. | 725/135 |
| 2004/0111467 A1 | 6/2004 | Willis | |
| 2004/0125133 A1 | 7/2004 | Pea et al. | |
| 2004/0205822 A1* | 10/2004 | Ullman et al. | 725/87 |
| 2004/0236865 A1* | 11/2004 | Ullman et al. | 709/231 |
| 2005/0034065 A1* | 2/2005 | Weight | 715/513 |
| 2005/0149987 A1 | 7/2005 | Boccon-Bigod et al. | |
| 2005/0193335 A1* | 9/2005 | Dorai et al. | 715/530 |
| 2005/0198015 A1 | 9/2005 | Sezan et al. | |
| 2005/0262542 A1* | 11/2005 | DeWeese et al. | 725/106 |
| 2006/0015923 A1 | 1/2006 | Chuah et al. | |
| 2006/0045470 A1* | 3/2006 | Poslinski et al. | 386/68 |
| 2006/0094409 A1 | 5/2006 | Inselberg | |
| 2006/0130109 A1* | 6/2006 | Zenith | 725/110 |
| 2006/0173974 A1* | 8/2006 | Tang | 709/217 |
| 2006/0248160 A1 | 11/2006 | Plummer | |
| 2007/0083423 A1* | 4/2007 | Delbridge | 705/12 |
| 2007/0168463 A1* | 7/2007 | Rothschild | 709/217 |
| 2007/0198738 A1* | 8/2007 | Angiolillo et al. | 709/231 |
| 2007/0226766 A1* | 9/2007 | Poslinski et al. | 725/89 |
| 2008/0059580 A1* | 3/2008 | Kalinowski et al. | 709/204 |
| 2008/0301232 A1* | 12/2008 | Facemire et al. | 709/205 |
| 2008/0320085 A1* | 12/2008 | Bouilloux-Lafont et al. | 709/206 |
| 2008/0320523 A1* | 12/2008 | Morris et al. | 725/47 |
| 2009/0064245 A1* | 3/2009 | Facemire et al. | 725/105 |
| 2009/0129747 A1* | 5/2009 | Casagrande | 386/95 |
| 2009/0187856 A1* | 7/2009 | Rapo et al. | 715/810 |
| 2009/0310668 A1* | 12/2009 | Sackstein et al. | 375/240.01 |
| 2010/0242074 A1* | 9/2010 | Rouse et al. | 725/100 |
| 2011/0047487 A1* | 2/2011 | DeWeese et al. | 715/758 |
| 2011/0173672 A1* | 7/2011 | Angiolillo et al. | 725/118 |
| 2012/0324491 A1* | 12/2012 | Bathiche et al. | 725/10 |
| 2013/0004138 A1* | 1/2013 | Kilar et al. | 386/230 |
| 2013/0086159 A1* | 4/2013 | Gharachorloo et al. | 709/204 |
| 2013/0091239 A1* | 4/2013 | Hao et al. | 709/217 |
| 2013/0198642 A1* | 8/2013 | Carney et al. | 715/738 |

* cited by examiner

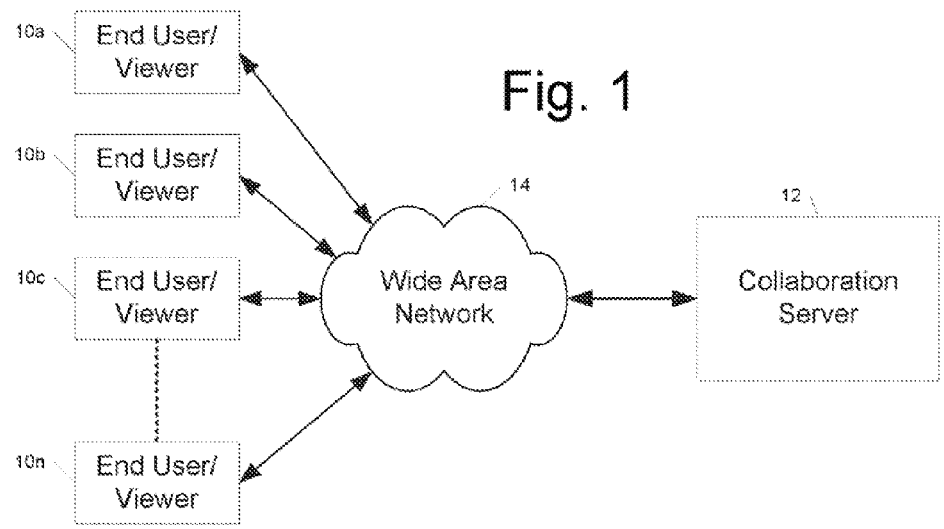
Fig. 1
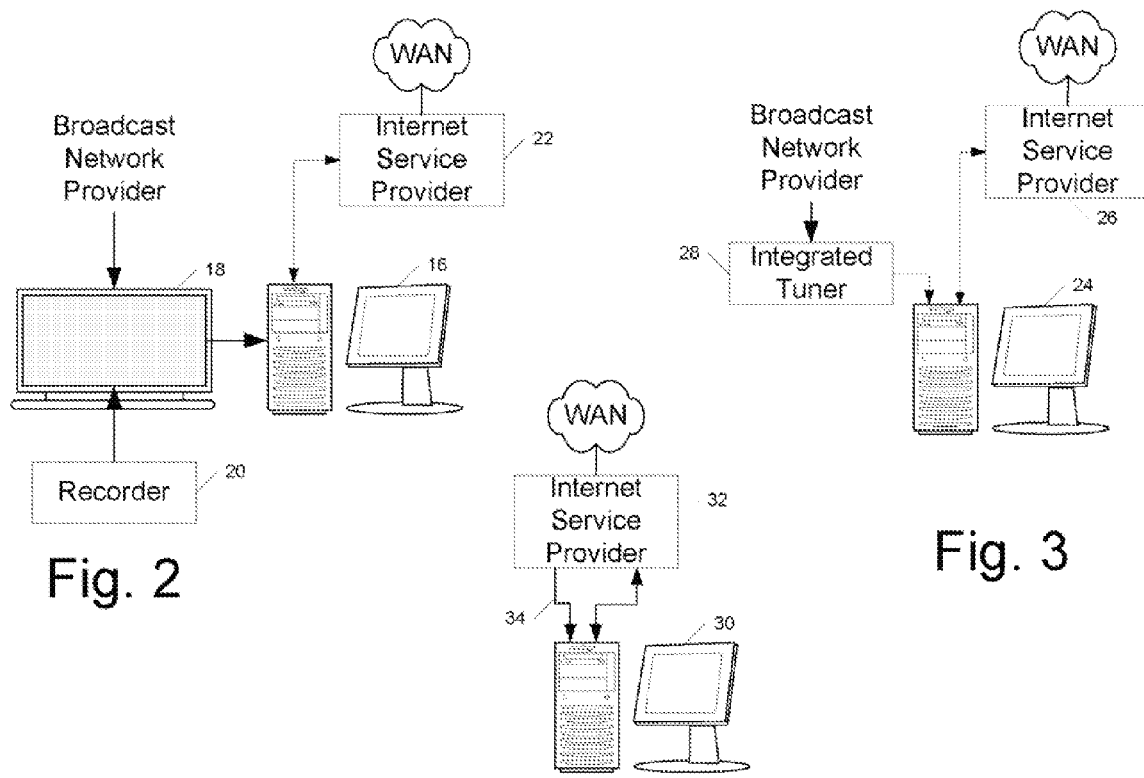
Fig. 2
Fig. 3
Fig. 4

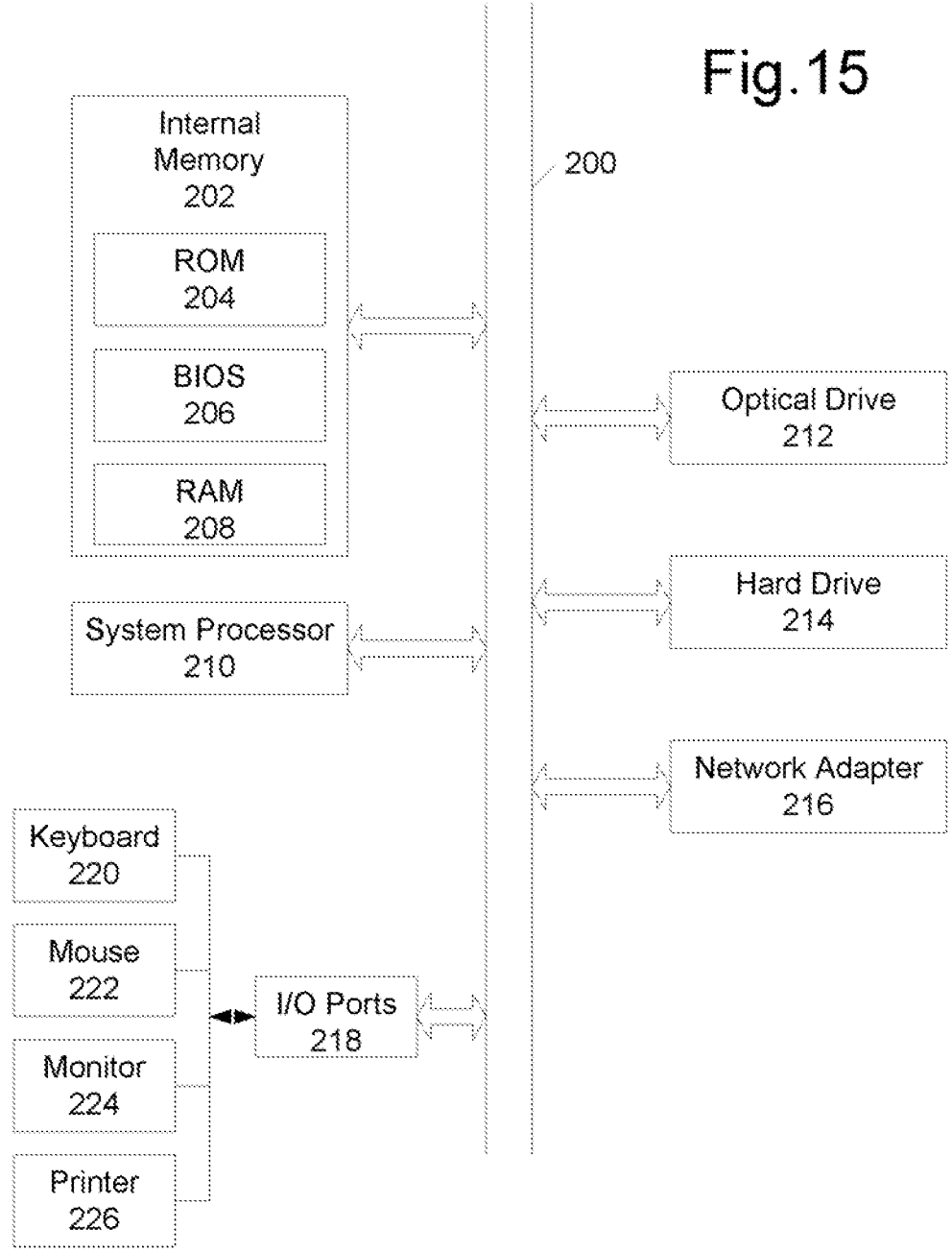

ENHANCED ONLINE COLLABORATION SYSTEM FOR VIEWERS OF VIDEO PRESENTATIONS

FIELD OF THE INVENTION

The present invention relates to online collaboration systems and more particularly to an enhanced online collaboration system for use by viewers of video presentations.

BACKGROUND OF THE INVENTION

Rapid growth in the availability of reasonably-priced but nevertheless powerful personal computer systems coupled with explosive growth of the Internet has created unprecedented opportunities for people to collaborate online with large numbers of other people on a local, national or even global scale. Online collaboration systems (e.g., chat rooms) have always been a popular way for computer users to exchange thoughts with one another on topics of common interest. In a typical online collaboration system, every user can independently create messages that are sent to a collaboration server. Unlike a conventional e-mail system where messages are stored until they are requested by the addressees, collaboration system messages are posted (i.e., made available to all other users of the system) as soon as they are received. Every user is free to comment on any previously posted messages. The intent of a typical collaboration system is to provide a text-based online equivalent of a room full of people, many of whom are trying to talk at the same time about generally the same topic.

Early collaboration systems rarely fulfilled that intent. Relatively low network data transmission rates, high data error rates and relatively slow personal computer systems combined to cause significant delays in distributing posted messages to users and more delays in receiving responses from those users. Since users could submit messages at any time without regard to what was currently being posted by the collaboration server, it was not uncommon for a discussion to completely change direction before a given user could respond to a previously posted comment. By the time the given user's message reached the collaboration server, other users would have taken the discussions in a different direction, reducing the relevancy of the given user's message.

Message delays limited the usefulness of online collaboration systems. While such systems were feasible where people wanted to collaborate on a topic that either didn't change or changed relatively slowly, such systems were too slow to be of real value if people wanted to collaborate about a "topic" happening in real time, such as a broadcast of a television show or other video event.

However, as both personal computer systems and networks have become faster, it has become more feasible for viewers to collaborate in real-time about events as those events happen; for example, about a football game that is underway or a current episode of a favorite television show during its original airing. And, as online collaboration systems have become better able to "keep up" with real-time events, such systems have became more popular with more viewers until there are now significant communities of people who tune in to watch the event while simultaneously, enthusiastically communicating with others online (both within their community and throughout their country or the world) about the event as it happens.

It is somewhat ironic that as technology enabling people to collaborate online in real-time about events becomes more widely available, people are finding it difficult to find the time to participate in such collaborations due to the demands of their personal and professional lives.

The problem is not that someone who misses a broadcast of an event when it first occurs will never be able to see the event. There are a variety of ways in which a viewer can see a recording of the event even after the event has been completed. Personal recording devices, such as digital video recorders (DVRs), are widely used to record events for later viewing. The popularity of such recording devices is increasing as the devices become cheaper and easier to use while providing better quality recordings. Features such as frame-by-frame or slow-motion playback have increased the popularity of such personal recording devices, particularly among sports fans.

There are other ways a person can see a broadcast of an event long after the original broadcast has ended. One such way takes advantage of the power of the Internet. Content providers, including the original broadcaster and authorized re-broadcasters, can stream recordings across the Internet either on a published schedule or on demand by an individual viewer, enabling the viewer to watch the recording at his or her convenience. Similarly, the original content provider or an authorized re-broadcaster may distribute an encore presentation (that is, a rerun) of the event through the original broadcast medium.

A user who wants to watch a post-original presentation of an event (whether in the form of a personal recording or an Internet download or a rerun) won't miss out on the event. What the user will miss out on is the opportunity to collaborate in real time with others who are also watching a post-original presentation of the same event at the same time.

SUMMARY OF THE INVENTION

The present invention assures that a viewer who has missed an original presentation of an event and wants to view the event as a post-original presentation will have an opportunity to collaborate online with others seeing the same presented material at the same time.

An online collaboration system makes available multiple online collaboration sessions for each video presentation. Each collaboration session is associated with a different time slot in the presentation. The system receives requests from one or more viewers who wish to collaborate with other viewers while watching the presentation. Each viewer is assigned to one of the available collaboration sessions, ideally a collaboration session associated with the time slot the viewer is currently watching. For example, if the viewer is currently watching content that occurs 19 minutes after the start of the presentation, the viewer is preferably assigned to a collaboration session associated with content occurring between 18 minutes and 20 minutes after the start of the presentation. The availability of multiple collaboration sessions associated with different time slots in the content decreases the chances the viewer will be thrown into a collaboration session with someone who has already seen more of the presentation and who may inadvertently or intentionally "spoil the ending" of the presentation for other viewers. As the presentation progresses, the viewer will progress through collaboration sessions associated with successively later time slots so the viewer will generally be collaborating with someone who has just as much of the presentation as the viewer, no matter when the presentation starts in "real world" time.

BRIEF DESCRIPTION OF THE DRAWINGS

While the specification concludes with claims that particularly point out and distinctly claim the invention, details of embodiments of the invention may be more readily ascertained from the following detailed description when read in conjunction with the accompanying drawings wherein:

FIG. 1 is a high a level schematic illustration of a network environment in which the present invention may be implemented;

FIG. 2 is a schematic representation of one form of end user system for use with the present invention;

FIG. 3 is a schematic representation of an alternate form of end user system for use with the present invention;

FIG. 4 is a schematic representation of another alternate form of end user system for use with the present invention;

FIG. 15 is a schematic illustration of a general purpose computer system that could implement the collaboration system or the personal computers shown in the drawings and discussed in the specification.

DETAILED DESCRIPTION

Figure 5:
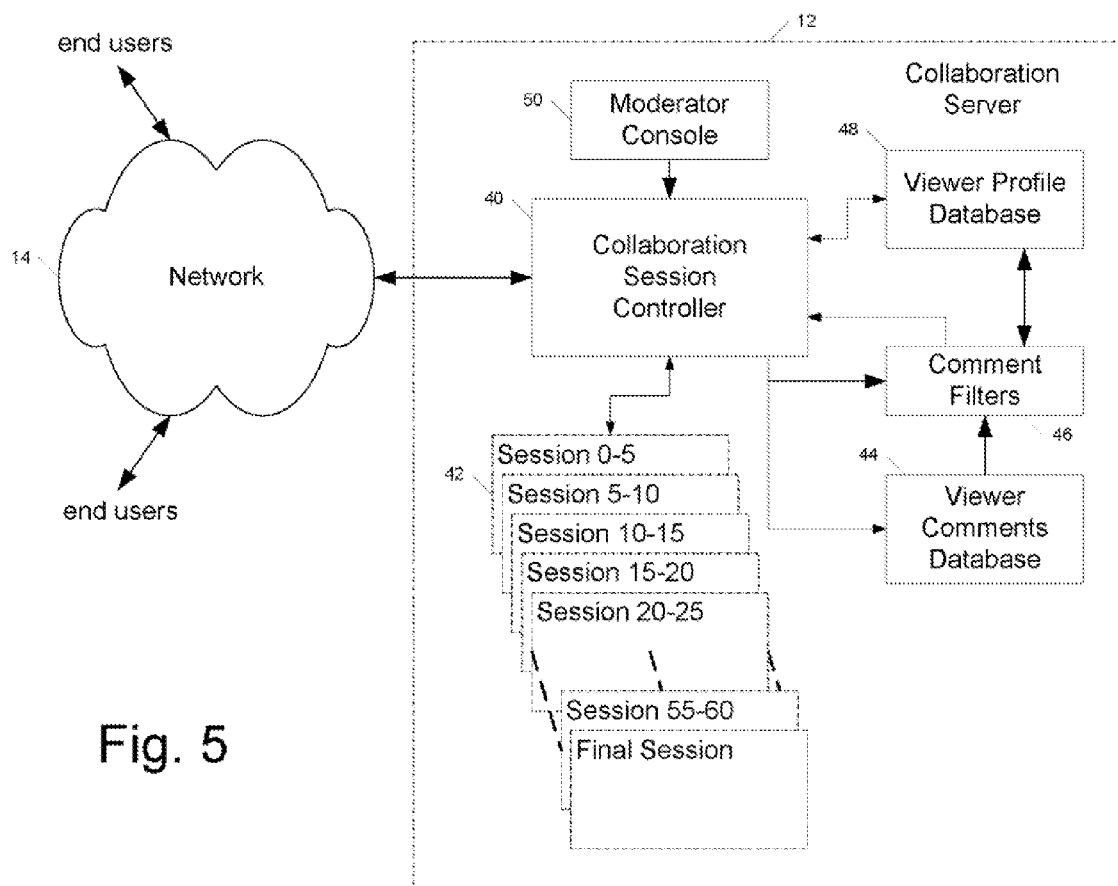
FIG. 5 is a schematic representation of a collaboration server implementing the present invention.

Referring to FIG. 1, an online collaboration system can be made available to end users/viewers 10a, 10b, 10c, . . . , 10n by a collaboration server 12 accessed by the end users/viewers through a wide area network 14, such as the Internet. The composite term "end-user/viewer" is a reference to the dual roles an individual may play when engaging in an online collaboration in the environment contemplated by this invention. On the one hand, the individual will be a viewer of a video presentation. On the other hand, the same individual will be an end-user of a personal computer system that will be used to establish the individual's access to the collaboration server 12. From time to time in this description, references will be made to an "end-user" or a "viewer". It needs to be remembered that those references may be to the same individual.

Although not shown in FIG. 1, each end-user will also be connected to a source for the video presentation the user wants to collaborate about. The video presentation can reach the user in different ways, several of which will be described with reference to FIGS. 2-4.

Referring now to FIG. 2, the user may have both a personal computer system 16 connected to a wide area network or WAN through an Internet service provider 22 and a separate television receiver 18 that can receive video programming from both to a broadcast network provider and a personal recorder 20, such as a digital video recorder or DVR. Preferably, the television receiver is linked to the personal computer system 16 to provide "view point" information; that is, timing information indicating exactly which part of the video presentation the viewer is actually seeing. The manner in which view point information is used is discussed in more detail later.

Referring to FIG. 3, the user may alternatively have a personal computer system 24 with an integrated tuner 28 for receiving broadcast video signals. In a system of this type, the computer monitor is used both to present the video and as the interface between the end-user and an Internet service provider 26. In an end user system of this type the view point information, referred to in the discussion of FIG. 2, is generated internally to the personal computer system 24.

Referring to FIG. 4, in still another form of end-user system, the video may be presented as an Internet download or data stream on a download path 34 between an Internet service provider 32 and the user's personal computer system 30. Again, the view point information referred to in the discussion of FIG. 2, is generated internally to the personal computer system.

Referring to FIG. 5, the collaboration server 12 which supports multiple end-users through the wide area network 14, includes a collaboration session controller 40 which sets up and maintains a large number of collaboration sessions represented by the set 42 of sessions. Each session in the set 42 is associated with a different time slot in a particular video presentation. The number of time slots in the set 42 is a function of the length of each time slot and the length of the presentation. As an example, assume each time slot is 5 minutes long and the video presentation is exactly 60 minutes long. For this example, at least twelve sessions would need to be made available for the presentation as shown in the following table:

| Session Number | Associated Time Slot (after Presentation start) |
|---|---|
| #1 | 0-5 minutes |
| #2 | 5-10 minutes |
| #3 | 10-15 minutes |
| #4 | 15-20 minutes |
| #5 | 20-25 minutes |
| #6 | 25-30 minutes |
| #7 | 30-35 minutes |
| #8 | 35-40 minutes |
| #9 | 40-45 minutes |
| #10 | 45-50 minutes |
| #11 | 50-55 minutes |
| #12 | 55-60 minutes |
| Final | After presentation ends |

While it is possible to limit the number of sessions to twelve (based on the initial assumptions of 5 minute time slots and a 60 minute presentation, it may be preferable to add a thirteenth time slot for a final session that would be open to any viewer who has finished watching the entire presentation. The final session would preferably remain open as long as at two or more viewers wanted to continue exchanging messages about the presentation. The final session could, at least in theory, remain open indefinitely as new viewers who have just finished viewing the entire presentation may continue to enter the session.

Also, depending on the type of presentation, the length of the time slots may be considerably shorter than five minutes, possibly on the order of two minutes, which should decrease the chances of a "spoiling" comment by a senior viewer in a session but would also obviously increases the number sessions required to cover the entire presentation.

A similar set of collaboration sessions must be set up for each video presentation the collaboration server is willing to support. If the collaboration server is willing to support collaborations about a reasonably large number of different video presentations, the number of collaboration sessions that will be simultaneously available will be substantial.

In one embodiment of the invention, multiple sets of collaboration sessions may be setup for viewers having different degrees of maturity. For example, at least four different sets of collaboration sessions may be set up for young viewers (age 12 and under), adolescent viewers (ages 13-18), adult viewers (ages 19-55) and senior viewers (ages 55+). While providing multiple sets of collaboration sessions obviously complicates the task of controlling the sessions, it increases the chance that viewers will be more likely to engage with someone who has a similar perspective on a presentation while decreasing the chance that a particular comment will be offensive or inappropriate to others participating in the same session. Maturity-related collaboration sessions would also make it more feasible for the collaboration service provider to provide moderators, working through a moderator console 50, for collaboration sessions open to younger viewers.

Based on the user's current viewpoint for a video presentation, information about the viewer maintained in a viewer profile database 48 and possible input from a moderator interacting with the collaboration server through the moderator console 50, a user's choice of collaboration sessions may be limited. Several different methods for assigning a user to a particular collaboration session are discussed in greater detail below.

Assuming for the moment that the viewer has joined a particular collaboration session associated with a particular time slot, the collaboration session controller 40 receives any comments the viewer makes and routes them to other viewers who are currently in the same session. The controller 40 can also cause those comments to be recorded in a viewer comments database 44. Stored comments are preferably "stamped" to identify the time slot to which the comments pertain to and any properties of the collaboration session (e.g., viewer age range) during which the comments were made.

The same video presentation may be seen a number of times by different sets of viewers. Comments made by some of those viewers might be of interest to future sets of viewers. A viewer comments database 44 is used to capture and store comments made by viewers during a particular presentation. The captured comments are then made available to future viewers of the presentation. Not every comment made by a viewer is necessarily worth keeping. Moderators, working through a moderator console 50, may filter incoming comments so that only worthwhile comments reach the database 44.

Stored comments are released to future sets of viewers after being filtered by a comment filter 46 to make sure the comments are not released to an inappropriate set of viewers; i.e., a set of viewers who have not yet seen the part of the presentation to which the comments apply or who are in a wrong age range.

In at least one embodiment of the invention, the comments database is also used to store a special type of comment that is exempt from the type of time filtering just described. This special type of comment can be referred to as a "trusted user" comment. A trusted user is basically any user that the collaboration service provider has concluded would not be likely to provide outcome-spoiling comments even if given the privilege of submitting comments for delivery to session members or individual participants who have not yet viewed the time slot to which the comment applies. A typical trusted user comment might be something like "Pay close attention to the last scene and let me know how you interpret it."

Trusted users can be chosen in different ways. An individual user may submit a list of users trusted by the individual user. A session moderator may, based on an individual user's past actions in the sessions, decide that user is trustworthy enough to be classified as a trusted user. The designation of a particular user as a trusted user is maintained in the viewer profile stored in the database 48.

Figure 6:
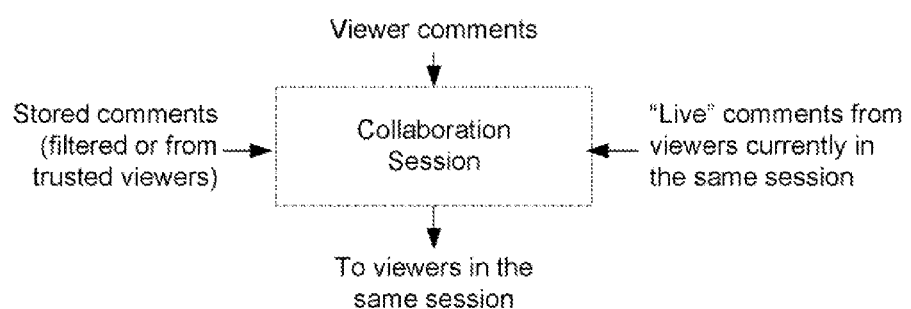
FIG. 6 is a schematic illustration of the flow of participant comments in an online collaboration system implementing the present invention.

FIG. 6 is a visual summary of the sources of comments that flow into and from a particular collaboration session. Where a user is logged into the collaboration session, any comments that viewer might make flow, of course, into the session as do "live" comments provided by other viewers participating into the same session. Stored comments made by viewers of earlier showings of the same video presentation may also flow into the session, assuming they survive time filtering tests or are provided by trusted users.

Figure 7:
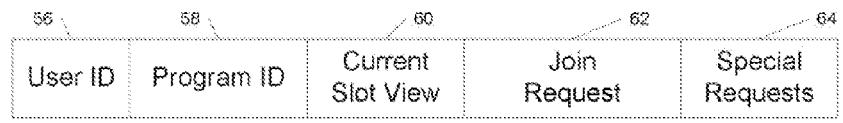
FIG. 7 is a representation of an end-user request to join an online collaboration system for viewers of a post-original presentation.

For a viewer to be assigned to an appropriate collaboration session, that viewer has to submit certain information to the collaboration server when asking to join one of the collaboration sessions. FIG. 7 is a schematic representation of essential elements of a join request. The request includes a user ID field 56 identifying the requesting user, a program ID field 58 specifically identifying the video presentation the viewer is or will be viewing, the time slot the viewer currently is watching (e.g., start of presentation, currently at 10 minutes after the start of presentation, etc.), a formal join request 62, and any special viewer requests. One example of a special request is the designation of a particular individual as a trusted user, which can happen where the joining user knows that the individual has already seen the presentation and left a set of comments for the joining user.

Figure 8:
FIG. 8 is a representation of the fields in an end-user comment message submitted to an online collaboration system which implements the present invention.

Once a user has joined a collaboration session every comment submitted by that user is packaged with other information needed by the collaboration server. FIG. 8 is a representation of at least some of the information the collaboration server may require with each submitted comment. A user ID field 66 identifies the comments submitter. A program ID field 68 identifies the video presentation (i.e., active collaboration session) to which the comment applies. A session ID identifies the viewer's current session, information that could be useful in maintaining the viewer comments database. The submitted information obviously must include the comment itself in a field 72 along with any special instructions 74 the submitter may have for handling the comment, e.g., "Make this comment available only to snivelyw@outpost.net".

Figure 9:
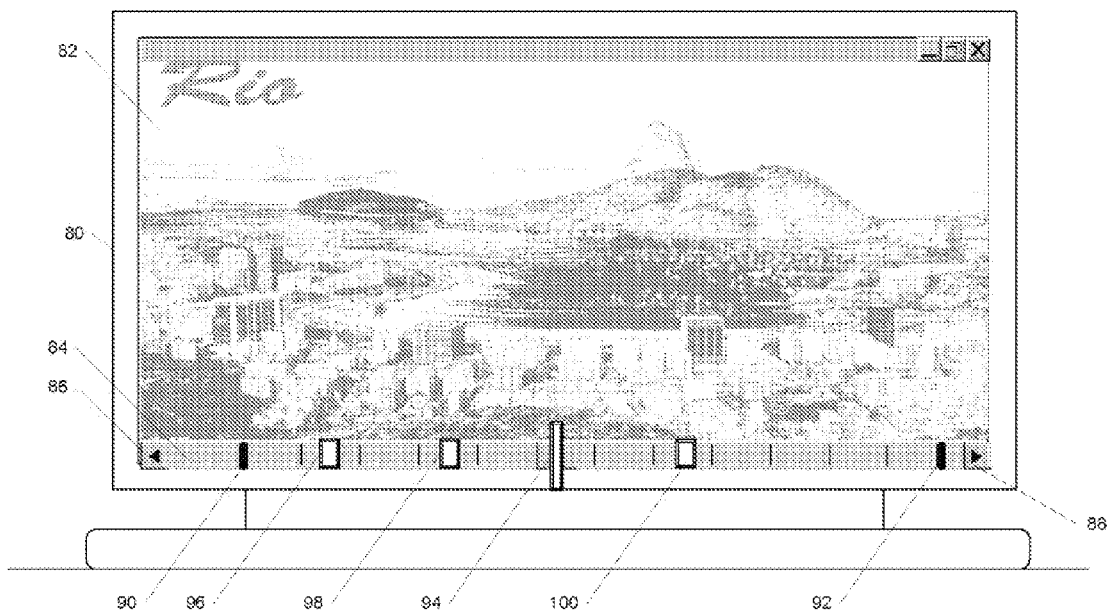
FIG. 9 is an illustration of elements of a graphical user interface that would facilitate end user use of the online collaboration system.

To make it easy for users to understand what their options are once they've logged onto the collaboration server and have identified the video presentation in which they are interested, a graphical user interface may be installed in each user's personal computer system. FIG. 9 shows some of the features of such a graphical user interface. The graphical user interface is, of course, presented on a display 80 showing the video presentation 82 chosen by the user. The display includes a progress bar 84, the length of which represents the length of the entire video presentation. A heavy bar 90 at the left end of the progress bar 84 indicates the start of the presentation while a similar heavy right bar 92 at the right end of the progress bar 84 indicates the end of the presentation. The progress bar itself may have division markers indicating the time slots with which different collaboration sessions are associated.

A unique view indicator 94 marks a viewer's current view point in the presentation. The position of indicator 94 in the drawing indicates who has watched roughly half of the presentation.

Additional indicators 96, 98 and 100 mark active collaboration sessions associated with particular time slots in the presentation. The absence of a session indicator in the time slot containing the view indicator 94 indicates that no one else is viewing the presentation at exactly the same place as the current viewer, at least no one that wants to collaborate online about it. In such a situation, the viewer may want to join one of the existing collaboration sessions 96, 98 and 100.

In a preferred embodiment, the viewer could be considered to have a right to join collaboration session 100 or any collaboration session to the right of the view indicator since the viewers in those sessions will have already seen everything the current viewer has seen. The viewer preferably would not have the right to join any collaboration sessions to the left of the view indicator 94 as the viewers in those sessions will not have seen as much of the presentation as the current viewer. An exception could be made if the viewer had already been identified as a trusted user. A transfer process for allowing a user to leave one collaboration session and join another is described later.

From a visual standpoint, both the user's view indicator and the collaboration session indicators will appear to march across the screen from left to right as the viewer sees more and more of the presentation and as viewers in a collaboration session associated with one time slot in the presentation "leave" that session and "enter" the session associated with the next time slot in the presentation. The users do not, of course, physically or electronically leave one collaboration session and join the next. What really happens is the session designation associated with the users changes front one time slot to the next.

Figure 10:
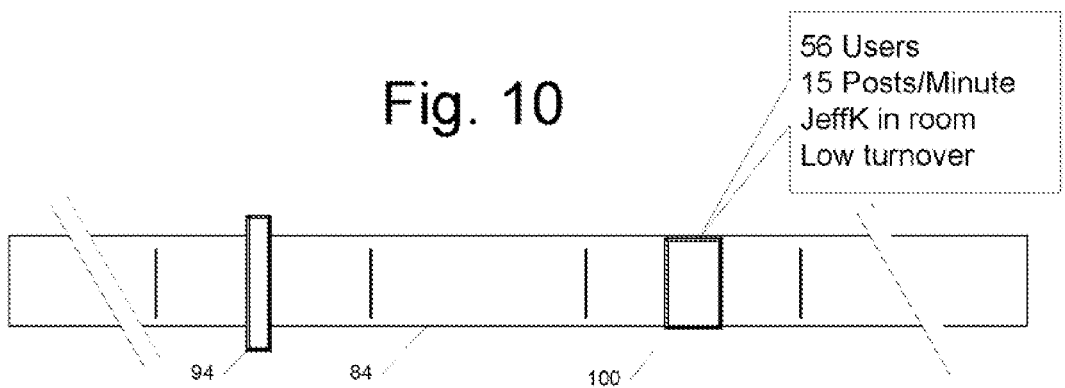
FIG. 10 is an enlarged view of a significant elements in the graphical user interface shown generally in FIG. 8.

Referring to FIG. 10, which is an enlarged view of a small section of the progress bar 84, if a user has a choice of collaboration sessions, a hover help technique may be used to give the user additional information that will be help him make that choice. By hovering a cursor over a session indicator, a user calls up a bubble displaying information about the indicated session. For example, the bubble may indicate how many other users are already in the session, the level of session activity indicated by the number of posts per minute, the presence of any of the user's "buddies" already in the session and the turnover rate for the session.

Figure 11:
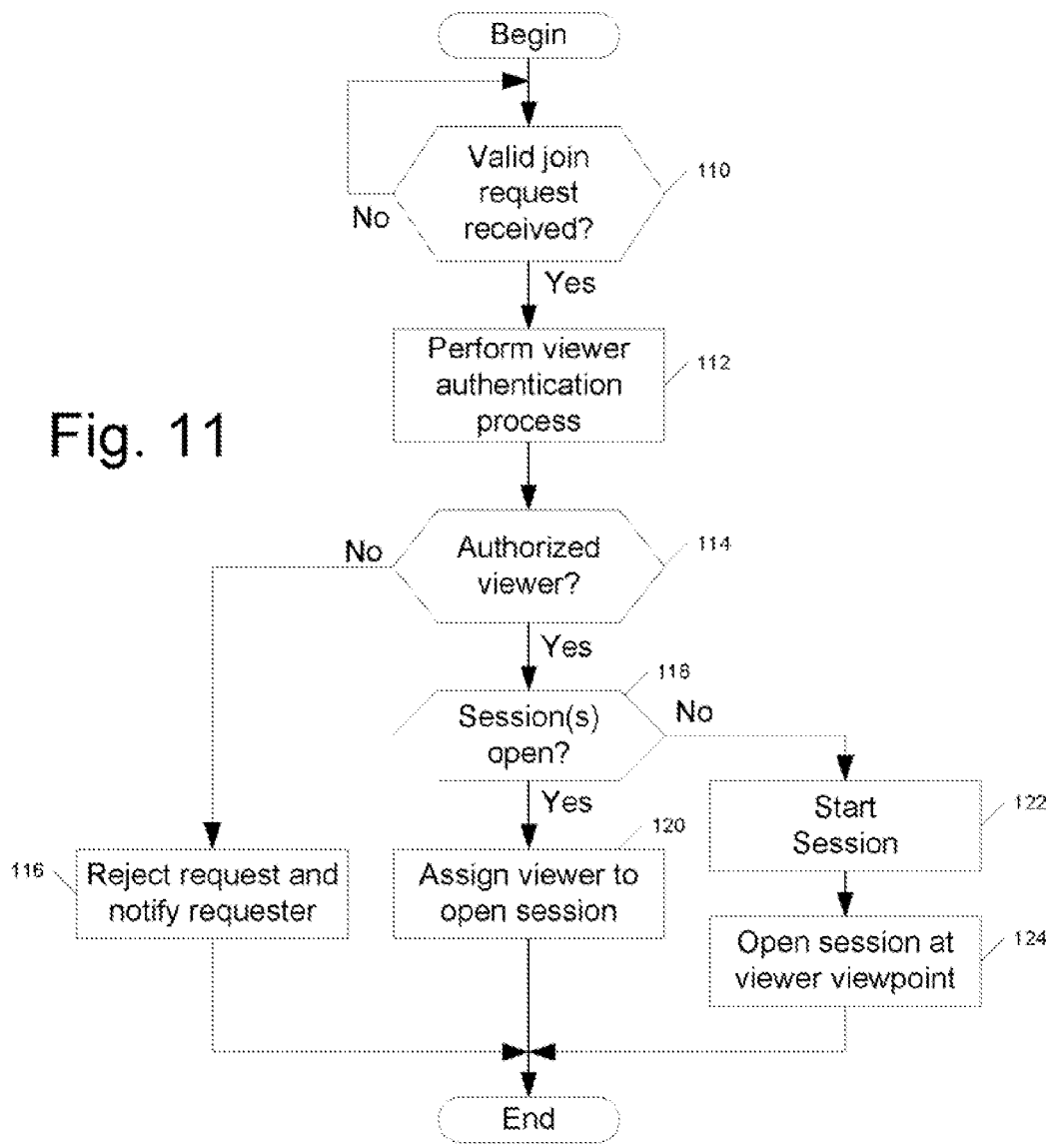
FIG. 11 is a flow chart of a basic join process enabling an end user to be assigned to an active collaboration session maintained by the online collaboration system.

FIG. 11 is a flowchart of a basic join process that anyone who wants to collaborate online must follow. The collaboration server continually monitors incoming traffic in a step 110 to see if the traffic includes any valid join requests. A valid join request would include the kind of information previously discussed with reference to FIG. 7. Until a valid join request is received, the program remains in a wait loop.

However, once a valid join request is received, the viewer is authenticated in a step 112. Assuming the viewer is found not to be authorized in step 114, the join request is rejected in a step 116 and the process ends. If the viewer is authenticated, the collaboration server checks (step 118) to determine whether there are any collaboration sessions associated with the video presentation identified by the user in the join request.

If no open collaboration sessions are found, the collaboration server can start a session (step 122) and associate the session with the time slot coincident with the viewer's view point (step 124).

If, however, there are already one or more open sessions, the viewer can be assigned to one of those open sessions in a step 120, possibly the session associated with the time slot closest to the user's current view point.

Figure 12:
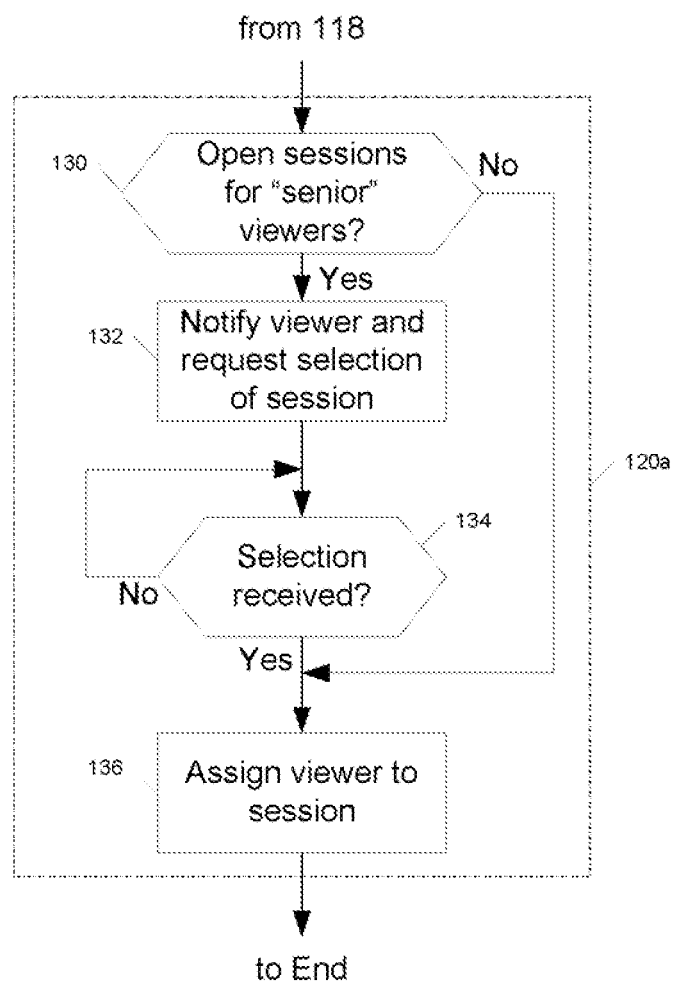
FIG. 12 is a flow chart of steps that would be performed in a specific implementation of the general join process.

The assignment step 120 in the basic join process described above is somewhat rudimentary. FIG. 12 is a flowchart of a more complex assignment step 120a. After authenticating the user, the collaboration server determines (step 130) whether there are any open sessions occupied by "senior" viewers. In this context, the term "senior" does not refer to the age of session participants but rather to whether they have seen more of the video presentation then the joining user. Assuming there are multiple such sessions, the viewer is notified (step 132) and asked to select one of the open sessions. The server would enter a wait state until it was determined (step 134) that the user's selection has been received. The user is then assigned to the selected session in a step 136.

If step 118 indicates there are no open collaboration sessions having "senior" participants, the viewer is assigned in step 136 to one of the existing open sessions occupied by "junior" session participants, perhaps with an admonition not to reveal information the participants had not yet seen.

Figure 13:
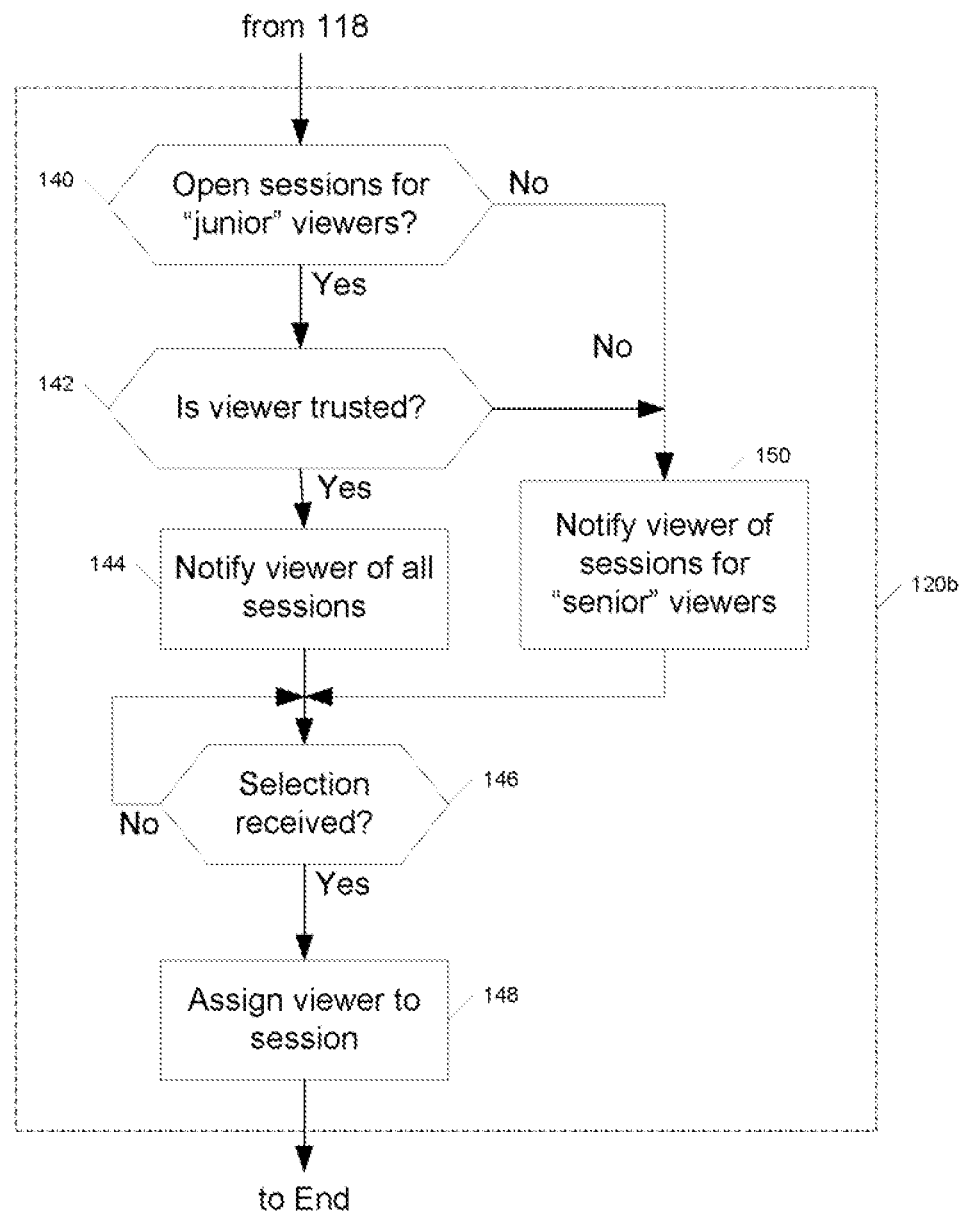
FIG. 13 is a flow chart of steps that would be performed in a different, specific implementation of the general join process.

FIG. 13 is still another possible assignment process 120b which takes into account whether the joining user has trusted user status. Once the user has been authenticated, a check is made whether there are any currently open collaboration sessions occupied by "junior" viewers of the specified video presentation; that is, viewers who have seen less of the presentation then the joining user.

If sessions of junior viewers are found, a check is made (step 142) whether the joining user is already classified as a trusted user. If the joining user is a trusted user, the user is notified (step 144) of all open sessions for the specified video presentation and asked to make a selection of the session he would like to join. Once the joining user's selection is received (step 146), the joining user is assigned to the selected session in a step 148.

If step 140 fails to reveal that there are open collaboration sessions of junior users, the joining viewer is notified of open sessions occupied by senior viewers (step 150) and asked to select one of those sessions. The process ends once the viewer is assigned to one of the open sessions.

Figure 14:
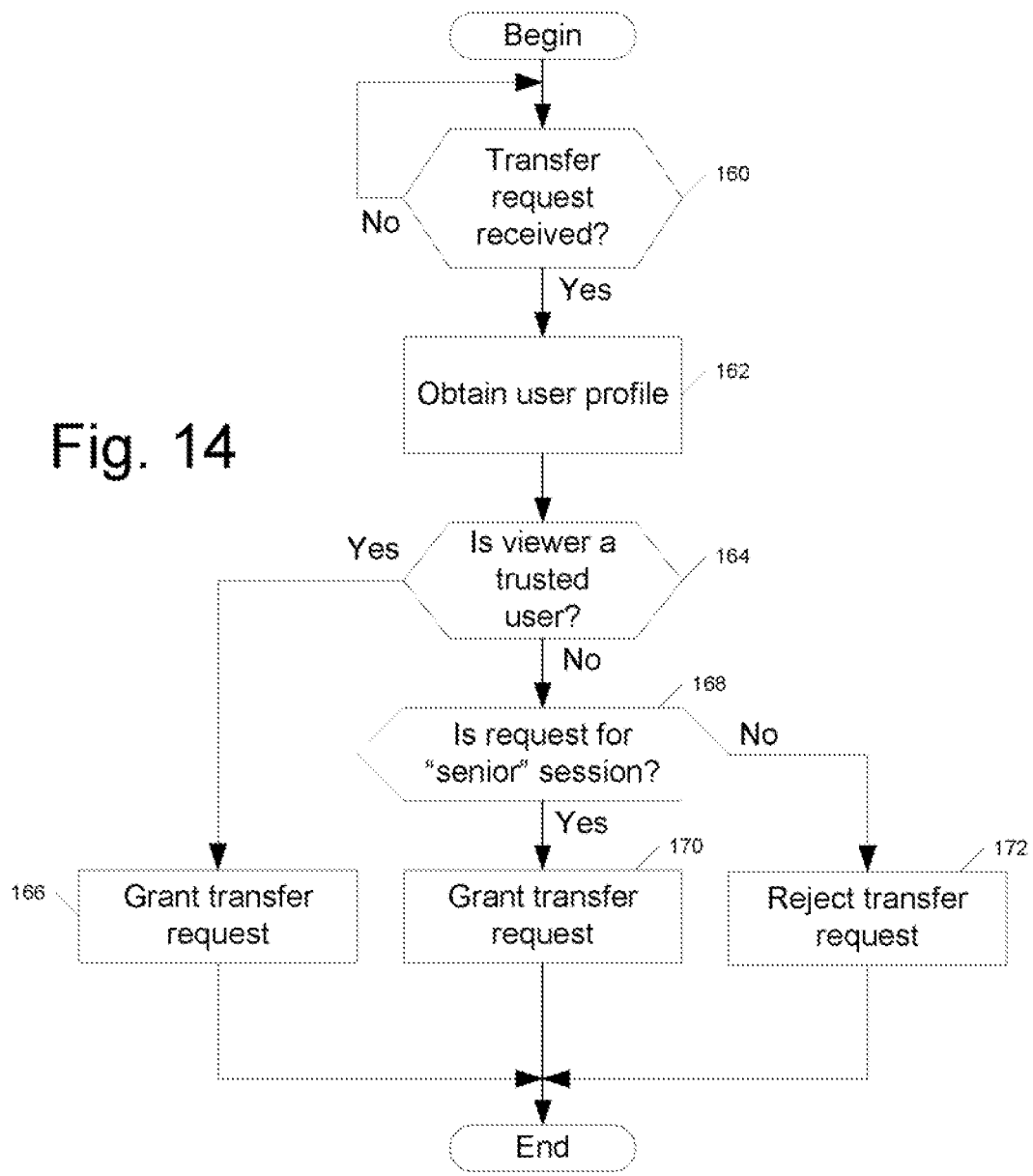
FIG. 14 is a flow chart of a transfer process that allows a user to leave one collaboration session and join another if predetermined conditions are satisfied.

A user who is assigned to a particular collaboration session may become dissatisfied with his experiences in the assigned session. FIG. 14 is a flowchart of the transfer process that would permit a dissatisfied user to leave one session and join another. The process begins (step 160) when a transfer request is received at the collaboration server. The collaboration server obtains the stored profile for the requesting user in a step 162 and determines whether the requesting user has been designated (step 164) as a trusted user. If the viewer is a trusted user, the transfer request is granted immediately in step 166 without regard to whether the requester wants to join a session occupied by senior or junior users.

If the user is found not to be a trusted user, a check is then made (step 168) whether the request is for a transfer to a senior session; that is, a session whose members have already seen as much or more of the presentation as the requesting user. If the request is for transfer to a senior session, the request is granted in step 170 and the transfer process ends. If, however, the request is for transfer to a junior session, the request is rejected in a step 172 before the transfer process ends.

The collaboration server may be implemented by programming a general purpose computer system to perform the specific functions described above. FIG. 15 is a schematic representation of such a general purpose computer system.

A computer system includes an internal system bus 200, a system processor 210, internal memory components 202 and one or more "external" memory components, such as an optical drive 212 and a magnetic hard drive 214. The internal memory 202 includes specific types of memory such as read only memory (ROM) 204, basic input/out system (BIOS) memory 206 and random access memory (RAM) 208. The BIOS 206 stores configuration information for the computer system and basic routines used to control the transfer of information among the components of the computer system.

A drive, such as optical drive 212 or hard drive 214, includes a computer usable medium that provides non-volatile storage for applications and processes that execute in the computer system and for data used in and/or generated by those applications and processes. Depending on the technology employed, the drives may include removable media. The special purpose programming needed by a computer system to implement the described invention would typically be stored in one of these drives and transferred as needed into RAM 208.

The computer system also includes a significant number of input/output (I/O) ports 218 that provide interfaces between a variety of input/output devices and the remainder of the computer system. Common examples of input/output devices include keyboard 220, mouse 222, monitor 224 and printer 226.

It should not be inferred that only the devices shown in FIG. 15 can be part of the computer system. There are simply too many different types of input/output devices to include in a drawing. Moreover, it should not be implied that the input/output ports 218 are limited to a particular technology. There are many different types of input/output ports that are used as device interfaces. Current examples of port technologies that are successfully used include serial ports, parallel ports, SCSI, USB ports, FireWire ports and infrared ports. Other port technologies undoubtedly already exist or will be developed.

Finally, the computer system will include one or more network adapters 216 that are needed to establish communications between the computer system and other computers. Many different types of network adapters exist today and there is no intent to limit the description to a particular type.

While specific embodiments of the Invention have been described, there is no intent to limit the scope of the invention to those specific embodiments. The scope of the invention includes not only the specific embodiments that also all variations and modifications that would occur to those of ordinary skill in the relevant art.

The invention claimed is:

1. A computer-implemented method for enhancing online collaboration among viewers of an event presentation, said method comprising:
   providing two or more online collaboration sessions, each collaboration session being associated with a different time slot in the event presentation, the time slot associated with each collaboration session beginning at a different time offset from the start of the event presentation and having a predetermined duration;
   displaying a graphical user interface on viewer computers showing the event presentation, the graphical user interface comprising:
      a progress bar having a length representing the duration of the event presentation,
      division markers along the progress bar indicating time slots with which the two or more collaboration sessions are associated,
      a view indicator marking a current viewpoint in the event presentation, and
      two or more session indicators marking the two or more collaboration sessions in the event presentation,
      wherein an absence of one of the session indicators in a particular time slot containing the view indicator indicates that no other viewer is viewing the event presentation in a same place as a current viewer, and
      wherein both the current viewer's view indicator and the session indicators move across the screen from left to right as the event presentation progresses and as the viewers in the two or more collaboration session associated with particular time slots in the event presentation move from a current collaboration session to a next collaboration session associated with a next time slot in the event presentation;
   receiving a request from the current viewer to join one of the two or more collaboration sessions;
   rejecting the current viewer request to join a selected one of the online collaboration sessions associated with a time slot closer to the start of the event presentation than a time slot associated with the current viewer's current viewpoint to prevent the current viewer from joining one of the collaboration sessions having viewers that have not viewed as much of the event presentation as the current viewer; and
   assigning the current viewer to a selected one of said two or more online collaboration sessions associated with a time slot closer to the end of the event presentation than the time slot associated with the current viewer's current viewpoint.

2. The computer-implemented method of in claim 1 further comprising:
   determining when the event presentation reaches the end of a particular time slot; and
   re-assigning viewers who had been assigned to the collaboration session associated with that particular time slot to a collaboration session associated with a time slot beginning at a greater time offset from the start of the event presentation.

3. The computer-implemented method of in claim 2 including the further step of receiving a viewer request to join an online collaboration session other than the current viewer's current online collaboration session.

4. The computer-implemented method of in claim 3 including the further steps of:
   determining whether the requesting viewer is identified as a trusted viewer; and
   if the requesting viewer is determined to be a trusted viewer, granting the viewer request without regard to the properties of the time slot associated with the requested collaboration session.

5. The computer-implemented method of in claim 2 wherein said session indicators include properties of the different ones of the collaboration sessions.

6. A computer-implemented system for providing enhanced online collaboration for viewers of an event presentation, said system comprising:
   an online collaboration system comprising at least one processor and memory that provides two or more collaboration sessions for the potential use of viewers of the event presentation, each of the collaboration sessions being associated with a different time slot in the event presentation, the time slot associated with each collaboration session beginning at a different time offset from the start of the event presentation and having a predetermined duration;

a visual display device controller that creates a graphical user interface for an end user display that displays a graphical user interface on viewer computers showing the event presentation, the graphical user interface comprising:
  a progress bar having a length representing the duration of the event presentation,
  division markers along the progress bar indicating time slots with which the two or more collaboration sessions are associated,
  a view indicator marking a current viewpoint in the event presentation, and two or more session indicators marking the two or more collaboration sessions in the event presentation,
  wherein an absence of one of the session indicators in a particular time slot containing the view indicator indicates that no other viewer is viewing the event presentation in a same place as a current viewer, and
  wherein both the current viewer's view indicator and the session indicators move across the screen from left to right as the event presentation progresses and as the viewers in the two or more collaboration session associated with particular time slots in the event presentation move from a current collaboration session to a next collaboration session associated with a next time slot in the event presentation; and a collaboration system controller that
  receives request from a current viewer to join one of the two or more collaboration sessions;
  rejects the current viewer request to join a selected one of the online collaboration sessions associated with a time slot closer to the start of the event presentation than a time slot associated with the current viewer's current viewpoint to prevent the current viewer from joining one of the collaboration sessions having viewers that have not viewed as much of the event presentation as the current viewer; and
  assigns the current viewer to a selected one of said two or more online collaboration sessions associated with a time slot closer to the end of the event presentation than the time slot associated with the current viewer's current viewpoint.

7. The computer-implemented system of in claim 6 wherein said collaboration system controller further comprises:
  an event presentation monitor for determining when the event presentation reaches the end of a particular time slot; and
  a user assignment controller for re-assigning users who had been assigned to the collaboration session associated with a particular time slot to a collaboration session associated with a time slot beginning at a greater time offset from the start of the event presentation.

8. The computer-implemented system of in claim 7 wherein each of said session indicators indicates the time slot of the associated online collaboration session relative to the start of the event presentation and one or more properties of the activity occurring in the collaboration session.

9. A computer program product comprising a non-transitory computer usable medium embodying program instructions for providing enhanced online collaboration among viewers of an event presentation, said program instructions when executed in a computer causing the computer to:
  provide two or more online collaboration sessions, each collaboration session being associated with a different time slot in the event presentation, time slot associated with each collaboration session beginning at a different time offset from the start of the event presentation and having a predetermined duration;
  display a graphical user interface on viewer computers showing the event presentation, the graphical user interface comprising:
    a progress bar having a length representing the duration of the event presentation,
    division markers along the progress bar indicating time slots with which the two or more collaboration sessions are associated,
    a view indicator marking a current viewpoint in the event presentation, and two or more session indicators marking the two or more collaboration sessions in the event presentation,
    wherein an absence of one of the session indicators in a particular time slot containing the view indicator indicates that no other viewer is viewing the event presentation in a same place as a current viewer, and
    wherein both the current viewer's view indicator and the session indicators move across the screen from left to right as the event presentation progresses and as the viewers in the two or more collaboration session associated with particular time slots in the event presentation move from a current collaboration session to a next collaboration session associated with a next time slot in the event presentation;
  receive a request from the current viewer to join one of the two or more collaboration sessions;
  reject the current viewer request to join to join one of said two or more collaboration sessions to prevent the current viewer from joining one of the collaboration sessions having viewers that have not viewed as much of the event presentation as the current viewer; and
  assign the current viewer to a selected one of said two or more online collaboration sessions associated with a time slot closer to the end of the event presentation than the time slot associated with the current viewer's current viewpoint.

10. The computer program product of claim 9 including additional program instructions that, when executed in the computer, causes the computer to:
  determine when the event presentation reaches the end of a particular time slot; and
  re-assign viewers who had been assigned to the collaboration session associated with said particular time slot to a collaboration session associated with the time slot beginning at a greater time offset from the start of the event presentation.

11. The computer program product of in claim 10 wherein the session indicators include properties of the different ones of the online collaboration sessions.

* * * * *